(12) United States Patent
García Castilla et al.

(10) Patent No.: US 10,618,457 B2
(45) Date of Patent: Apr. 14, 2020

(54) TORQUE LIMITING ADJUSTER

(71) Applicants: Valeo Iluminación, S.A., Martos, Jaén (ES); Talleres Protegidos Gureak, S.A., San Sebastián, Guipúzcoa (ES)

(72) Inventors: José García Castilla, Jaén (ES); Miguel Ángel Azcue Méndez, Guipúzcoa (ES); Juan Antonio Rubia Mena, Jaén (ES)

(73) Assignees: Valeo Iluminacion, S.A. (ES); Talleres Protegidos Gureak, S.A. (ES)

( * ) Notice: Subject to any disclaimer, the term of this patent is extended or adjusted under 35 U.S.C. 154(b) by 0 days.

(21) Appl. No.: 15/654,994

(22) Filed: Jul. 20, 2017

(65) Prior Publication Data
US 2018/0022265 A1    Jan. 25, 2018

(30) Foreign Application Priority Data

Jul. 21, 2016  (ES) .................................. 201630990
Sep. 16, 2016  (EP) .................................... 16382435

(51) Int. Cl.
*F21V 19/02*     (2006.01)
*F21V 21/14*     (2006.01)
*B60Q 1/076*     (2006.01)
*B60Q 1/068*     (2006.01)

(52) U.S. Cl.
CPC ........... *B60Q 1/076* (2013.01); *B60Q 1/0686* (2013.01); *F21V 19/02* (2013.01); *F21V 21/14* (2013.01)

(58) Field of Classification Search
CPC ......... B60C 1/06; B60C 1/068; B60C 1/0686; B60C 1/076; F21V 19/02; F21V 21/14
USPC .................................................. 362/523–532
See application file for complete search history.

(56) References Cited

U.S. PATENT DOCUMENTS 7,198,392 B2    4/2007  Hobbs et al.

*Primary Examiner* — Jason Moon Han
(74) *Attorney, Agent, or Firm* — Cantor Colburn LLP

(57) ABSTRACT

A torque limiting adjuster for adjusting the position of an adjustable part of a lighting device includes a housing, an output shaft, a driving gear, a driven gear, and a biasing element. The housing includes a main opening and a first threaded portion. The driven gear includes a gearing portion adapted to be engaged with the driving gear. The driving and driven gears are engaged by the biasing element. The output shaft has a first linear guiding portion oriented in a main direction and a second threaded portion coupled with the first threaded portion. The driven gear has a second linear guiding portion slidably coupled with the first linear guiding portion. The second linear guiding portion is configured to transmit the rotation of the driven gear to the first linear guiding portion when the driven gear rotates driven by the driven gear. The driven gear exerts a reaction force on the driving gear that overcomes the biasing element when the driven gear is forced to rotate beyond the predetermined limit position.

15 Claims, 3 Drawing Sheets

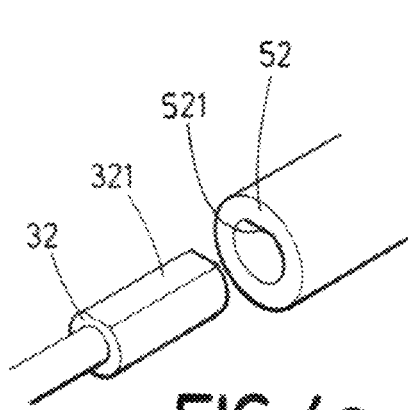
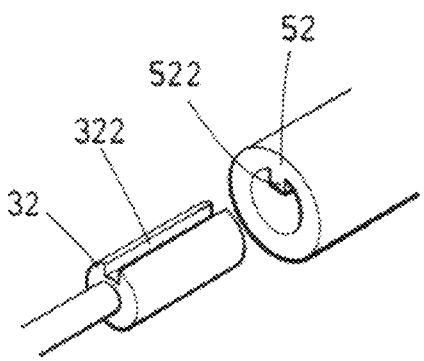
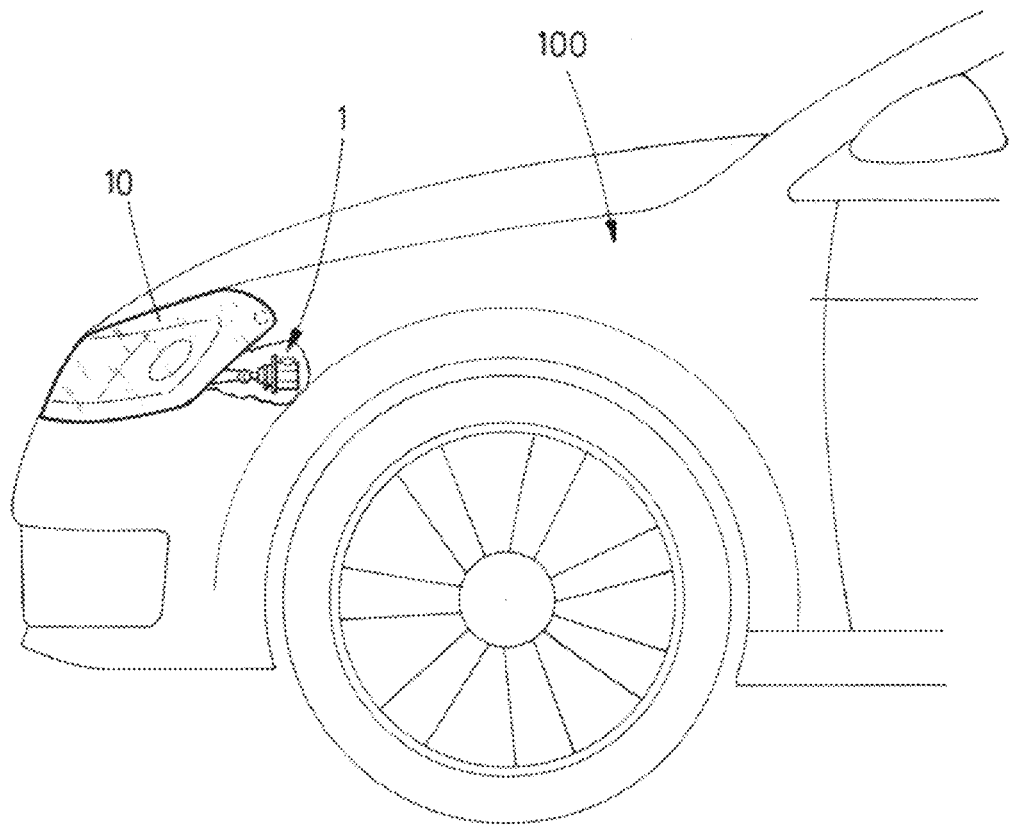

TORQUE LIMITING ADJUSTER

CROSS-REFERENCE TO RELATED APPLICATIONS

This application is related to and claims the benefit of Spanish Patent Application No. ES201630990, filed on Jul. 21, 2016, and European Patent Application No. 16382435.2, filed on Sep. 16, 2016 (which claims priority to the '990 application), the contents of both are herein incorporated by reference in their entirety.

TECHNICAL FIELD

This disclosure belongs to the field of torque limiting adjusters as the ones used in adjusting automotive parts such as headlamps.

BACKGROUND

Lighting devices, such as headlamps, the same as other automotive parts, usually require some linear setting.

This setting is carried out by means of adjusters. This pieces usually comprise a shaft which is able to move linearly. By this linear movement of the shaft, and a balancing rod connected to the end of the shaft and to the piece to be adjusted, the latter may be adjusted.

In these adjusters, the shaft is usually moved by a gear movement. This gear movement is easily controlled by a movement of the user. But when the output shaft reaches a predetermined limit position, the gear movement must be uncoupled from the shaft movement, so as to avoid damaging the piece to be adjusted.

This uncoupling is usually detected by an increase in the torque needed to make the output shaft exit beyond its limit position. This increase in the required torque is detected by a piece which uncouples the gear and the shaft. An example of such a torque limiting adjuster is found in document U.S. Pat. No. 7,198,392 B2. In this document, an adjuster is disclosed, comprising an output shaft, a drive gear, a threaded portion, a threaded sleeve, a spring and a driven gear that allow the headlamp adjuster to clutch. When a maximum value of torque is reached, the drive gear will force the driven gear to slide on and along an external spline of the threaded sleeve, thereby compressing the spring. The driven gear will continue to slide away from the drive gear until the drive gear is no longer engaged with the driven gear.

An alternative device for such purpose is provided by the present disclosure. This alternative device aims at reducing the number of parts, thus achieving a simpler device and a less expensive manufacturing and maintenance.

SUMMARY

The disclosure provides a solution for this problem by means of a torque limiting adjuster according to claim 1. Preferred embodiments of the disclosure are defined in dependent claims.

The disclosure provides a torque limiting adjuster for adjusting the position of an adjustable part of a lighting device, the torque limiting adjuster comprising
  a housing comprising a main opening and a first threaded portion;
  an output shaft partially housed inside the housing with a first end protruding from the main opening of the housing, the first end being engageable with the adjustable part;
  a driving gear;
  a driven gear comprising a gearing portion adapted to be engaged with the driving gear, the driven gear being configured to rotate until a predetermined limit position when being driven by the driving gear;
  a biasing element arranged to exert a biasing force onto the driving gear against the driven gear so as to engage the driving gear and the driven gear.

The output shaft further comprises a first linear guiding portion oriented in a main direction and a second threaded portion located between the first end of the output shaft and the first linear guiding portion and coupled with the first threaded portion of the housing.

Furthermore, the driven gear further comprises a second linear guiding portion slidably coupled with the first linear guiding portion, the second linear guiding portion being configured to transmit the rotation of the driven gear to the first linear guiding portion when the driven gear rotates driven by the driven gear; the coupling of the first and second threaded portions being configured to allow the output shaft to move linearly with respect to the housing when the output shaft rotates driven by the driven gear; the torque limiting adjuster being thereby configured to provide a linear movement of the output shaft with respect to the driven gear in the main direction when the driving gear is actuated; the torque limiting adjuster being arranged in such a way that when the driven gear is forced to rotate beyond the predetermined limit position, the driven gear exerts a reaction force on the driving gear that overcomes the biasing force.

Such an adjuster provides a simpler way of solving the problem of absorbing the torque when the predetermined limit position has already been reached, without resorting to a threaded sleeve in between the driven gear and the output shaft, in contrast to some conventional adjusters. The operating of the torque limiting adjuster of the disclosure is based on a different principle. This confers the adjuster of the disclosure a simpler and more robust configuration, thus prolonging the life cycle of this element.

In some particular embodiments, the predetermined limit position is achieved by means of an abutment which is located in the second threaded portion of the output shaft, so that when this abutment is reached, the output shaft stops moving in this direction.

The first threaded portion and the second threaded portion are intended to couple. In some embodiments, the first threaded portion comprises a housing threaded portion and the second threaded portion comprises a shaft flange, adapted to thread with the housing threaded portion. In other embodiments, the first threaded portion comprises a housing threaded portion and the second threaded portion comprises a shaft threaded portion, suitable for matching the housing threaded portion. In other embodiments, it is the first threaded portion that comprises a housing flange and the second threaded portion comprises a shaft threaded portion.

When the first threaded portion comprises a housing flange which is located around the main opening, this housing flange in the main opening of the housing provides a simple way of coupling with the shaft threaded portion.

When the first threaded portion comprises a housing threaded portion adapted to thread with the shaft threading portion, the housing threaded portion is a more secure way of providing threading means for coupling with the second threaded portion.

In some particular embodiments, the first linear guiding portion comprises a first flat face and the second linear guiding portion comprises a second flat face adapted to fit the first flat face.

These embodiments provide for an easy way of engaging the first and second linear guiding portions in such a way that the longitudinal relative movement along the main direction is allowed but the rotational relative movement between the driven gear and the output shaft is not allowed when the output shaft moves linearly in the main direction X due to the coupling of the first and second threaded portions.

In some particular embodiments, the first linear guiding portion comprises a first linear slot in turn comprising the first flat face, the first linear slot being oriented in the main direction, and the second linear guiding portion comprises a second linear slot in turn comprising the second flat face, the second linear slot being oriented in the main direction and fitting the first linear slot.

These particular embodiments provide a more reliable way of engaging the driven gear and the output shaft, transmitting the rotatory movement but letting the output shaft freely move in the main direction with respect to the driven gear when the output shaft moves linearly in the main direction X due to the coupling of the first and second threaded portions.

In a particular embodiment, the driving gear comprises a ball-shaped end rotatably coupled to a ball joint located in the housing, in such a way that when the driven gear exerts the reaction force on the driving gear, the driving gear rotates around the ball joint.

This particular embodiment allows the use of a single biasing element, as the movement of the driving gear is limited to a rotation around the ball joint. This rotation may be controlled with a single biasing element, thus making the adjuster simpler and easier to manufacture.

In a particular embodiment, the biasing element, which generally is formed of any spring-like structure, is a bended plate. This particular embodiment of biasing element is easy and cheap to manufacture and does not need any additional support to exert the biasing force.

In a particular embodiment, the biasing force is comprised between 1 kN/m and 2 kN/m. In a more particular embodiment, the biasing force is comprised between 1.35 kN/m and 1.45 kN/m. These values are high enough to keep the driving gear against the driven gear during normal operation, but they are low enough to be overcome by the reaction force generated by the output shaft and transmitted by the driven gear to the driving gear when one tries to exceed the predetermined limit position.

In particular embodiments, the biasing element comprises at least one of steel, brass, aluminium or plastic. These materials are perfectly suitable to achieve the biasing force needed for the adjuster of the disclosure.

In a particular embodiment, the gearing portion is conical. This feature allows the driven gear to adapt to situations where the driven gear and the driving gear are not only perpendicular to one another, but also forming a different angle, thus allowing a more flexible arrangement of the adjuster.

In another inventive aspect, the disclosure provides a module for a lighting device, comprising a torque limiting adjuster according to the previous inventive aspect.

A module should be understood in this document as an assembly comprising different lighting and optical parts capable of providing a lighting or signalling function (e.g. high beam function, low beam function or anti-fog function) in an automotive vehicle.

In another inventive aspect, the disclosure provides a lighting device comprising one or several of the modules described in the previous paragraph. In a particular embodiment, the lighting device is either a headlamp (e.g. a headlamp comprising a low beam and a high beam module) or a fog lamp (e.g. a fog lamp comprising an anti-fog module).

In another inventive aspect, the disclosure provides an automotive vehicle comprising a lighting device.

BRIEF DESCRIPTION OF THE DRAWINGS

To complete the description and in order to provide for a better understanding of the disclosure, a set of drawings is provided. Said drawings form an integral part of the description and illustrate an embodiment of the disclosure, which should not be interpreted as restricting the scope of the disclosure, but just as an example of how the disclosure can be carried out. The drawings comprise the following figures:

FIGS. 4a and 4b show the first and second linear guiding portions of two different embodiments of torque limiting adjusters according to the disclosure; and FIG. 5 shows a vehicle with a lighting device comprising a torque limiting adjuster according to the disclosure.

DETAILED DESCRIPTION OF THE DRAWINGS

Figure 1:
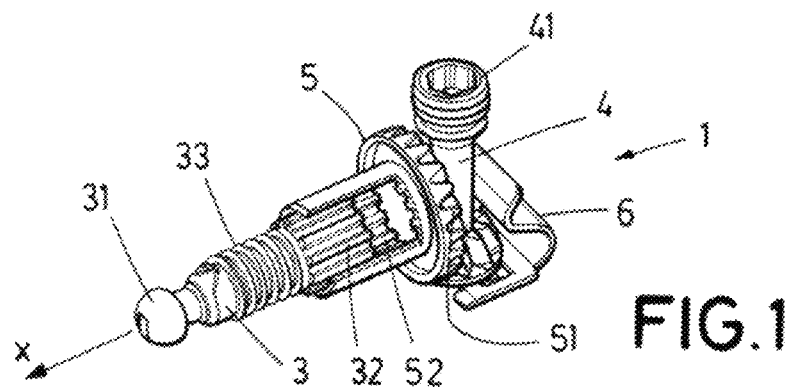
FIG. 1 shows a perspective view of a longitudinal section of a torque limiting adjuster according to the disclosure.

FIG. 1 shows a perspective view of a longitudinal section of a torque limiting adjuster 1 according to the disclosure.

In this figure, the torque limiting adjuster 1, which is suitable for adjusting the position of an adjustable part of a lighting device, comprises a housing (not shown in this figure), an output shaft 3, a driving gear 4, a driven gear 5 and a biasing element 6.

The output shaft 3 comprises a first end 31 and a threaded portion 33. This first end 31 is engageable with the adjustable part. Since the adjuster 1 is intended to regulate the position of the adjustable part, the attachment between the adjuster 1 and the adjustable part is made by means of this first end 31. In this embodiment, the first end 31 comprises a ball-joint, suitable for being rotatably coupled to the adjustable part, thus transmitting the linear movement of the output shaft 3 to the adjustable part.

The driven gear 5 comprises a gearing portion 51 which is coupled with the driving gear 4. The driving gear 4 is arranged to be adjusted manually or automatically by a user, and transmits its movement to the gearing portion 51 of the driven gear 5. When this happens, the driven gear 5 rotates.

The biasing element 6 is arranged to exert a biasing force onto the driving gear 4 so as to engage the driving gear 4 and the driven gear 5. The transmission of the movement from the driving gear 4 to the driven gear 5 may only take place when these two gears are engaged. The biasing element 6 forces these two gears to be engaged, ensuring the correct transmission of this movement takes place.

The output shaft 3 further comprises a first linear guiding portion 32 oriented in the main direction X, such that the threaded portion 33 is located between the first end 31 of the output shaft 3 and the first linear guiding portion 32. The first linear guide portion 32 is coupled to a second linear guide portion 52 of the driven gear 5. This coupling is arranged so that the rotatory movement is transmitted from the driven gear 5 to the output shaft 3, but these linear guiding portions are both oriented in the main direction X, so that they may slide from one another freely in this main direction when the output shaft 3 moves linearly in the main direction X.

Figure 2A:
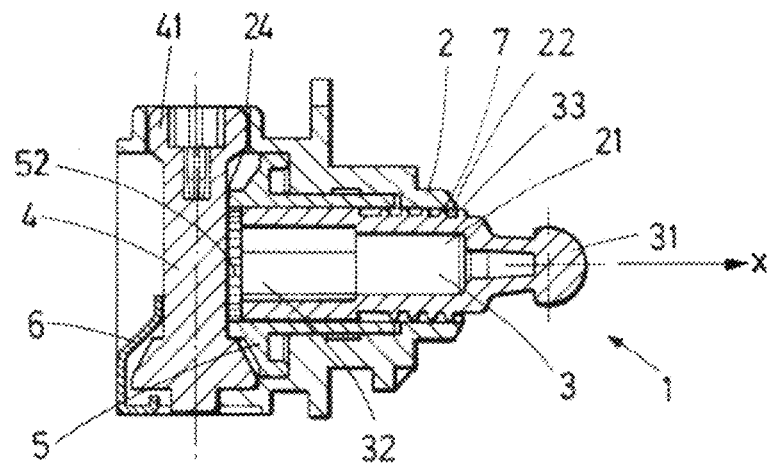
FIGS. 2a and 2b show a side view of this longitudinal section of the embodiment of the torque limiting adjuster of FIG. 1 in two different positions.
Figure 2B:
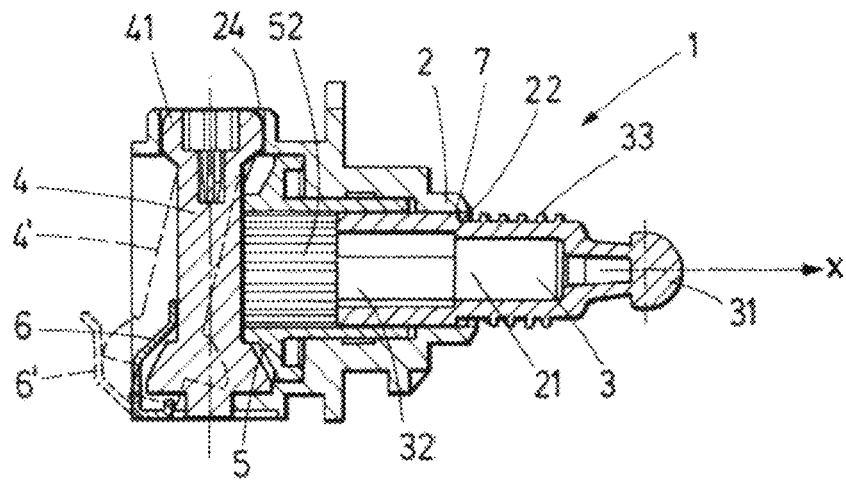

FIGS. 2a and 2b show a side view of this longitudinal section of this embodiment of the torque limiting adjuster 1, in two different positions. In this figure, the housing 2 is also shown. The housing 2 comprises a main opening 21 and a housing flange 22 which is located around the main opening 21. These elements are suitable for allowing the relative movement of the output shaft 3 and the housing 2 in a main direction X, since the shaft threaded portion 33 is coupled to the housing flange 22, such that when the output shaft 3 rotates, the shaft threaded portion 33 uses the housing flange 22 as a guide for the threading movement.

The output shaft 3 is partially housed inside the housing 2. The first end 31 protrudes from the main opening 21 of the housing 2.

When the driven gear 5 transmits the rotatory movement to the output shaft 3, the output shaft 3 rotates around the same axis as the driven gear 5, which is the main direction X. As a consequence, the shaft threaded portion 33 of the output shaft 3, which is coupled to the housing flange 22 of the main opening 21 of the housing 2, goes forward or backward, due to this coupling, causing the movement of the whole output shaft 3. Since the coupling of the first 32 and second 52 linear guide portions allow the relative movement between the output shaft 3 and the driven gear 5 in the main direction, the output shaft 3 is free to move forward or backward along this main direction X.

The movement of the output shaft 3 is limited by a predetermined limit position. This predetermined limit position is set to avoid the malfunction of the adjustable part, protecting it from the effects of an excessive displacement. FIG. 2b shows the torque limiting adjuster 1 reaching this predetermined limit position.

In this embodiment, this predetermined limit position is achieved by means of an abutment 7 which is located in the shaft threaded portion 33 of the output shaft 3, so that when this abutment reaches the housing flange 22, the output shaft 3 stops moving in this direction. Even if the driven gear 5 tries to move the output shaft 3, the abutment 7 prevents the output shaft 3 from moving. As a consequence, the driven gear 5 becomes also blocked by the abutment 7. When the driving gear 4 tries to move the driven gear 5 which is blocked in this position, the driven gear 5 exerts a reaction force, which comes from the abutment 7 which has reached the limit position. The driving gear 4 thus receives this reaction force, and exerts this reaction force against the biasing member 6. The driving gear biased position 4' and the biasing member biased position 6' are shown in dotted lines in this figure. The biasing member 6 is calibrated so that the biasing force is not very high, so that the reaction force caused by the driving member 4 is enough to overcome this biasing force, but high enough to keep the driving gear 4 in contact with the driven gear 5. In a particular embodiment, this biasing force is comprised between 1.35 kN/m and 1.45 kN/m.

In the embodiment shown in this figure, the driving gear 4 comprises a ball-shaped end 41 rotatably coupled to a ball joint 24 located in the housing 2, in such a way that when the driven gear 5 exerts a reaction force on the driving gear 4, it rotates around the ball joint 24. However, alternative arrangements are also possible in some different embodiments.

Figure 3A:
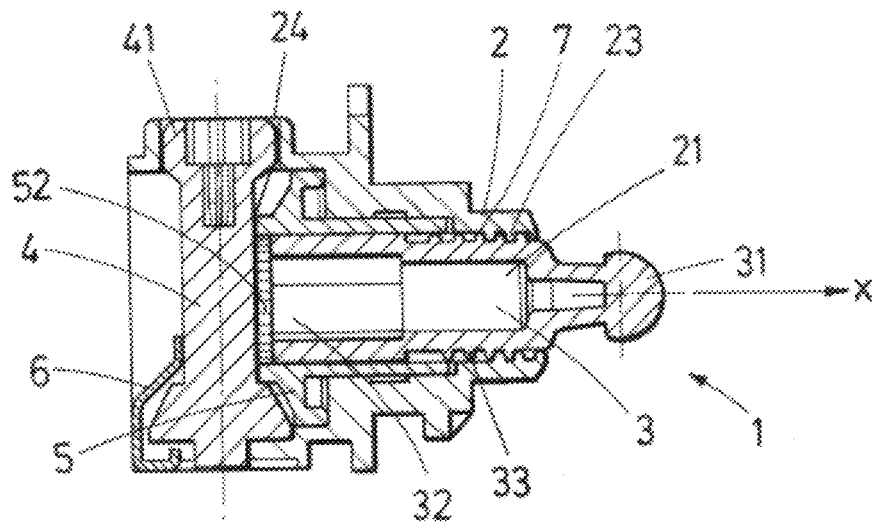
FIGS. 3a and 3b show a side view of this longitudinal section of another embodiment of the torque limiting adjuster of the disclosure in two different positions.
Figure 3B:
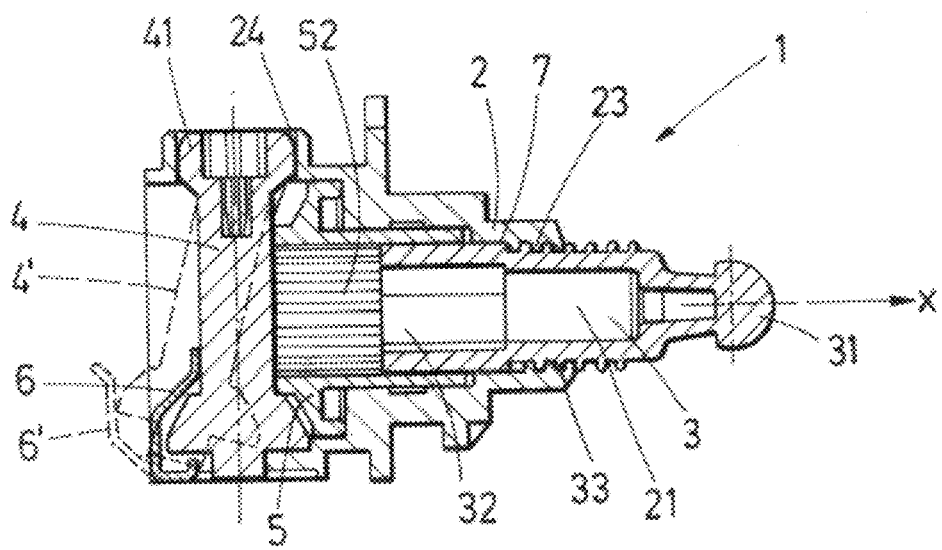

FIGS. 3a and 3b show a side view of a longitudinal section of a different embodiment of the torque limiting adjuster 1, in two different positions.

The difference with respect to the previous embodiment is that the torque limiting adjuster of FIGS. 3a and 3b comprises a housing threaded portion 23 instead of the housing flange 22 which was comprised in the previous embodiment.

The housing threaded portion 23 of the embodiment shown in these figures works under the same principle as the housing flange 22 of the previous embodiment. It acts as a guide for the shaft threaded portion 33, contributing to convert the rotatory movement of the output shaft 3 into linear relative movement between the output shaft 3 and the housing 2 in the main direction. The use of a housing threaded portion 23 instead of a housing flange 22 is recommended when the stress is too high for a simple flange.

FIGS. 4a and 4b show the interaction between the first and second linear guiding portions of two different embodiments of torque limiting adjusters according to the disclosure.

FIG. 4a shows a first linear guiding portion 32 comprising a first flat face 321 and a second linear guiding portion 52 of the same torque limiting adjuster comprising a second flat face 521 adapted to fit the first flat face 321.

FIG. 4b shows a first linear guiding portion 32 of a different torque limiting adjuster comprising a first linear slot 322 oriented in the main direction X and the second linear guiding portion 52 comprising a second linear slot 522 oriented in the main direction and fitting the first linear slot 322.

FIG. 5 shows a vehicle 100 with a lighting device 10 comprising a torque limiting adjuster according to the disclosure. In this case, the automotive vehicle comprises a headlamp 10 comprising a module with a torque limiting adjuster 1 according to the disclosure. In other embodiments, a foglamp may comprise this torque limiting adjuster 1.

In this text, the term "comprises" and its derivations such as "comprising", etc. should not be understood in an excluding sense, that is, these terms should not be interpreted as excluding the possibility that what is described and defined may include further elements, steps, etc.

The disclosure is obviously not limited to the specific embodiments described herein, but also encompasses any variations that may be considered by any person skilled in the art (for example, as regards the choice of materials, dimensions, components, configuration, etc.), within the general scope of the disclosure as defined in the claims.

The invention claimed is:

1. A torque limiting adjuster for adjusting the position of an adjustable part of a lighting device, the torque limiting adjuster comprising
    a housing comprising a main opening and a first threaded portion;
    an output shaft partially housed inside the housing with a first end protruding from the main opening of the housing, the first end being engageable with the adjustable part;
    a driving gear;
    a driven gear comprising a gearing portion adapted to be engaged with the driving gear, the driven gear being configured to rotate until a predetermined limit position when being driven by the driving gear;

a biasing element arranged to exert a biasing force onto the driving gear so as to engage the driving gear and the driven gear;

wherein the output shaft further comprises a first linear guiding portion oriented in a main direction and a second threaded portion located between the first end of the output shaft and the first linear guiding portion and coupled with the first threaded portion of the housing; and the driven gear further comprises a second linear guiding portion slidably coupled with the first linear guiding portion, the second linear guiding portion being configured to transmit the rotation of the driven gear to the first linear guiding portion when the driven gear rotates driven by the driven gear; the coupling of the second threaded portion and the first threaded portion being configured to allow the output shaft to move linearly with respect to the housing when the output shaft rotates driven by the driven gear; the torque limiting adjuster being thereby configured to provide a linear movement of the output shaft with respect to the driven gear in the main direction when the driving gear is actuated;

the torque limiting adjuster being arranged in such a way that when the driven gear is forced to rotate beyond the predetermined limit position, the driven gear exerts a reaction force on the driving gear that overcomes the biasing force.

2. The torque limiting adjuster according to claim 1, wherein the first threaded portion comprises a housing flange which is located around the main opening.

3. The torque limiting adjuster according to claim 1, wherein the first threaded portion comprises a housing threaded portion adapted to thread with the second threaded portion of the output shaft.

4. The torque limiting adjuster according to claim 1, wherein the first linear guiding portion comprises a first flat face and the second linear guiding portion comprises a second flat face adapted to fit the first flat face.

5. The torque limiting adjuster according to claim 4, wherein the first linear guiding portion comprises a first linear slot in turn comprising the first flat face, the first linear slot being oriented in the main direction, and the second linear guiding portion comprises a second linear slot in turn comprising the second flat face, the second linear slot being oriented in the main direction and fitting the first linear slot.

6. The torque limiting adjuster according to claim 1, wherein the driving gear comprises a ball-shaped end rotatably coupled to a ball joint located in the housing, in such a way that when the driven gear exerts the reaction force on the driving gear, the driving gear rotates around the ball joint.

7. The torque limiting adjuster according to claim 1, wherein the predetermined limit position is achieved by means of an abutment which is located in the second threaded portion of the output shaft.

8. The torque limiting adjuster according to claim 1, wherein the biasing element is a bended plate.

9. The torque limiting adjuster according to claim 1, wherein the biasing force is comprised between 1 kN/m and 2 kN/m, particularly between 1.35 kN/m and 1.45 kN/m.

10. The torque limiting adjuster according to claim 1, wherein the biasing element comprises at least one of steel, brass, aluminium or plastic.

11. The torque limiting adjuster according to claim 1, wherein the gearing portion is conical.

12. A module for a lighting device, comprising a torque limiting adjuster according to claim 1.

13. A lighting device comprising the module according to claim 12.

14. The lighting device according to claim 13, wherein the lighting device is either a headlamp or a foglamp.

15. An automotive vehicle comprising the lighting device according to claim 13.

* * * * *